United States Patent
Schuberth et al.

(10) Patent No.: US 10,029,684 B2
(45) Date of Patent: Jul. 24, 2018

(54) METHOD FOR OPERATING A LONGITUDINALLY GUIDING DRIVER ASSISTANCE SYSTEM OF A MOTOR VEHICLE AND MOTOR VEHICLE

(71) Applicant: AUDI AG, Ingolstadt (DE)

(72) Inventors: Stefan Schuberth, Gaimersheim (DE); Ralf Held, Eichstätt (DE); Florian Brücklmaier, Mainburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/543,963

(22) PCT Filed: Dec. 19, 2015

(86) PCT No.: PCT/EP2015/002570
§ 371 (c)(1),
(2) Date: Jul. 14, 2017

(87) PCT Pub. No.: WO2016/112945
PCT Pub. Date: Jul. 21, 2016

(65) Prior Publication Data
US 2018/0015920 A1 Jan. 18, 2018

(30) Foreign Application Priority Data
Jan. 17, 2015 (DE) ......................... 10 2015 000 539

(51) Int. Cl.
*B60W 30/14* (2006.01)
*B60W 50/00* (2006.01)
(Continued)

(52) U.S. Cl.
CPC .... *B60W 30/143* (2013.01); *B60W 30/18072* (2013.01); *B60W 50/0097* (2013.01);
(Continued)

(58) Field of Classification Search
CPC ......... B60W 30/143; B60W 30/18072; B60W 50/0097; B60W 50/085
See application file for complete search history.

(56) References Cited

U.S. PATENT DOCUMENTS 8,055,427 B2 * 11/2011 Shin ..................... B60W 10/06
180/179

FOREIGN PATENT DOCUMENTS

DE         10303010 A1     8/2004
DE     102007018733 A1    10/2008
(Continued)

OTHER PUBLICATIONS

International Search Report and Written Opinion of the International Searching Authority, with attached English-language tanslation, directed to related International Patent Application No. PCT/EP2015/002570, dated Apr. 22, 2016; 19 pages.
(Continued)

*Primary Examiner* — Todd M Melton
(74) *Attorney, Agent, or Firm* — Sterne, Kessler, Goldstein & Fox, PLLC

(57) ABSTRACT

Method for operating a longitudinal driver assistance system (13) of a motor vehicle (12) which is designed to regulate the speed of the motor vehicle (12) to a control speed, wherein—depending on environment data describing the operating environment in which the motor vehicle (12) is currently operated—the control speed can be changed from a desired speed (3) provided by a driver to a target speed (5) (which is provided for an upcoming operating environment (2) and/or can be determined from the environment data), wherein, when there is a change of the desired speed (3) to a new target speed (5) for an upcoming operating environment (2), for a predetermined time period and/or a predetermined distance in the upcoming operating environment (2), an intermediate speed (6) deviating from the target (Continued)

Figure 1:
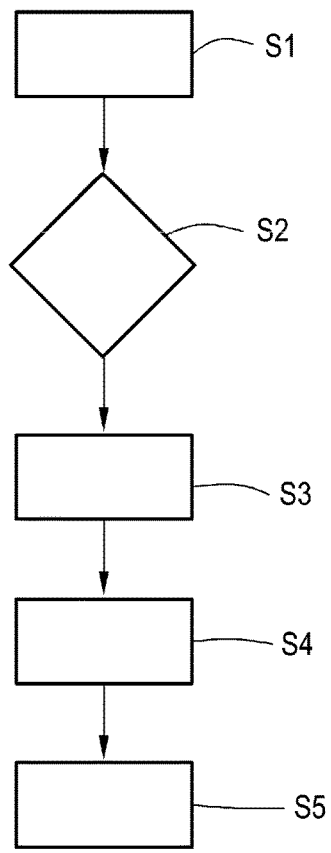

speed (5) in the direction of the current speed of the motor vehicle (12) is initially regulated to, which intermediate speed (6) is between the current speed of the motor vehicle (12) and the target speed (5), before the target speed (5) is regulated to after the time period expires or before the distance is traversed.

14 Claims, 2 Drawing Sheets

(51) Int. Cl.
*B60W 50/08* (2012.01)
*B60W 30/18* (2012.01)
(52) U.S. Cl.
CPC ..... *B60W 50/085* (2013.01); *B60K 2310/244* (2013.01); *B60W 2540/04* (2013.01); *B60W 2550/143* (2013.01); *B60W 2550/22* (2013.01); *B60W 2550/402* (2013.01); *B60W 2720/10* (2013.01)

(56) References Cited

FOREIGN PATENT DOCUMENTS

| | | |
|---|---|---|
| DE | 102010018097 A1 | 12/2010 |
| DE | 102011113909 A1 | 3/2012 |
| DE | 102011116741 A1 | 4/2012 |
| DE | 102013216705 A1 | 3/2014 |
| DE | 102013205609 A1 | 10/2014 |
| EP | 2527222 A2 | 11/2012 |
| WO | 2010139383 A1 | 12/2010 |

OTHER PUBLICATIONS

International Preliminary Report on Patentability, with attached English-language translation, directed to related International Patent Application No. PCT/EP2015/002570, dated Dec. 1, 2016; 13 pages.

\* cited by examiner

METHOD FOR OPERATING A LONGITUDINALLY GUIDING DRIVER ASSISTANCE SYSTEM OF A MOTOR VEHICLE AND MOTOR VEHICLE

The invention relates to a method for operating a longitudinal driver assistance system of a motor vehicle which is designed to regulate the speed of the motor vehicle to a control speed, wherein—depending on environment data describing the operating environment in which the motor vehicle is currently operated—the control speed can be changed from a desired speed provided by a driver to a target speed (which is provided for an upcoming operating environment and/or can be determined from the environment data). In addition, the invention relates to a motor vehicle.

Such longitudinal driver assistance systems are already known in the prior art. Examples of this are speed control systems (GRA), which are often also referred to as cruise control, and ACC systems ("Adaptive Cruise Control") which—when an additional motor vehicle drives in front of the particular motor vehicle—regulates a desired distance, especially a desired time gap, from this additional motor vehicle. In such longitudinal driver assistance systems, the driver typically provides a desired speed that should be maintained whenever possible, meaning that the desired speed is set for the typical operating case as a control speed to which regulation is oriented.

Modern longitudinal driver assistance systems now often offer an auxiliary function via which legal and/or otherwise reasonable speed limits in the operating environments in which the motor vehicle is operated may be detected. Environment data, which may be configured in different ways, may be used for this. For example, it is thus known to read data about speed limits, recommended speeds and the like on specific road segments from digital map data of a navigation system of the motor vehicle. An additional variant that was proposed is the detection of speed limits for upcoming operating environments based on camera data of a camera installed in the motor vehicle. For example, traffic signs and the like may be detected and processed accordingly by image processing. If such a speed limit is detected that is below the set desired speed, the control speed may be set to a target speed corresponding to the speed limit as long as the speed limit exists. For example, if a driver has set a desired speed of 80 km/h and approaches a built-up area, the control speed for driving through this area (as an upcoming operating environment) may temporarily be set to a target speed of 50 km/h, ideally such that the target speed of 50 km/h is already achieved upon entering the area, thus at the boundary of the upcoming operating environment.

This automatic adaptation of the control speed does not always proceed to the fullest satisfaction of the driver, especially when dealing just with recommended speeds, if outdated digital map data are used, or incorrect detection of traffic signs occurs; even in the case of other speed limits, it is often desired by drivers to be able to drive marginally faster than this target speed. In other words: the target speed that is set as a control speed does not necessarily need to coincide with the intended desired speed of the driver that applies to the operating environment.

Consequently, longitudinal driver assistance systems have already been proposed in which an additional operating capability exists that allows an offset speed to be added to the target speed, which offset speed may naturally in principle also have a negative value. For example, an operating lever may be provided via which the driver may adjust the offset in 5 km/h increments. Most of these functionalities provide that such an offset must be newly selected for each environment within said environment since experience shows that the desired offset speeds for different operating environments are often different even for the same driver.

This may now lead to the situation that, at the boundary of the upcoming operating environment for which the target speed should be regulated as a control speed, a braking to below the target speed is initially performed in order to subsequently accelerate again after selection of an offset. For example, in the case of a built-up area as an operating environment, it may occur that a braking to a target speed of 50 km/h is first performed in order to then accelerate to 55 km/h again after the driver has selected an offset speed via the control element. This is disadvantageous not only to the comfort in the motor vehicle, but also to the fuel consumption due to braking and the subsequent acceleration.

The invention is therefore based on the object of specifying an operating method for a longitudinal driver assistance system that, upon braking to target speeds as new control speeds, enables an operation of the motor vehicle that is more comfortable and optimized with regard to fuel consumption, especially when an offset function is used.

To achieve this object, in a motor vehicle of the aforementioned type it is provided according to the invention that, when there is a change of the control speed to a new target speed for an upcoming operating environment, for a predetermined time period and/or a predetermined distance in the upcoming operating environment, an intermediate speed deviating from the target speed in the direction of the current speed of the motor vehicle is initially regulated, which intermediate speed is between the current speed of the motor vehicle and the target speed, before the target speed is regulated to after the time period expires or before the distance is traversed.

Consequently, a longitudinal driver assistance system is thereby assumed which, as is known in principle, evaluates environment data in order to establish predetermined target speeds (which especially correspond to speed limits) for upcoming operating environments, especially route segments. If this target speed is below the desired speed, the control speed is lowered to the target speed. However, according to the invention it is now provided not to regulate to this new target speed as a control speed immediately, but rather to initially use a target speed as a control speed that ultimately symbolizes a tolerance via which all regulations to target speeds, especially with regard to speed limits, are "blurred" somewhat. That means that it is not the exact target speed but rather, when there is a necessary reduction of the speed of the motor vehicle to the target speed, a somewhat larger value—the intermediate speed—that is adjusted to at the boundary of the upcoming operating environment, especially of the route segment. If the boundary of the upcoming operating environment to which the target speed relates has been passed, the correct target speed—especially the correct speed limit—is correctly adjusted to after a finite, predetermined time that may be defined via a time period and/or a distance. It is thereupon noted that it may also be provided to immediately regulate to the target speed as a control speed when the current speed of the motor vehicle is between the target speed and an intermediate speed, for example a predetermined or determined intermediate speed.

The reaching of the intermediate speed is thereby typically regulated upon reaching a boundary of the upcoming operating environment, which means that the motor vehicle (which typically currently has a higher speed than the intermediate speed) that is still located outside of the upcoming operating environment (especially the route segment) is braked so that the intermediate speed (instead of the target speed) is set upon reaching the boundary of the upcoming operating environment. This shows that the present invention advantageously allows it to be possible for the fuel consumption to be markedly reduced by omitting an active braking, or at least by reducing the braking portion in the speed reduction zone, in which the control speed is to be adjusted via free running and trailing maneuvers. Because the target speed does not need to be achieved at the boundary of the operating environment, the possibility results, for example, to already achieve the intermediate speed at the boundary solely via realization of a trailing state (engine braking) or even a coasting state (free running).

Additional advantages result in the embodiment in which an offset speed for the operating environment is adjustable by the driver, wherein the target speed plus the offset speed is selected as a control speed after selection of an offset speed in the operating environment. This is the instance discussed above, in which a driver may select an offset of the target speed for a specific operating environment, thus especially a specific route segment. For example, if the target speed is 55 km/h, via selection of an offset of 5 km/h the driver may ensure that a speed of 55 km/h is regulated to as a control speed. In the past, this led to the situation that braking to 50 km/h initially took place, but then acceleration to 55 km/h again occurred. Within the scope of the present invention, such maneuver changes are smaller or no longer possible at all, especially when the intermediate speed corresponds to the target speed plus the offset speed or is greater than the target speed plus the offset speed. A harmonious adjustment to the control speed actually desired by the driver then results that takes into account the target speed, since the possibility to adjust the offset speed that he desires—and consequently to accordingly correct the control speed—is provided to the driver within the predetermined time period or within the predetermined distance.

In summary, a more fluid and more comfortable manner of driving with lower fuel consumption is consequently possible that makes do with fewer changes between coasting, trailing and braking states, and deliberately provides a time period in which the driver may select an offset speed.

The intermediate speed may thereby be determined from a tolerance interval around the target speed and a corresponding limit of the same. The use of a tolerance interval is especially appropriate if target speeds are to be achieved both via acceleration and via slowing processes, such that then an intermediate speed may be determined for approaching the target speed both from above and from below. Naturally, it is also conceivable to select the tolerance interval to be symmetrical.

The intermediate speed may be adjustable by the driver, especially in the form of a tolerance interval. At the beginning of an operating environment, this means that the driver may consequently specify how far he would like to deviate from the target speed provided there. Such a presetting may take place as a percentile; however, it is also conceivable to make fixed offset values adjustable.

However, in a preferred embodiment it is provided that the intermediate speed is selected depending on the and/or additional environment data, and/or on the target speed and/or the current speed, and/or on other operating data of the motor vehicle. Various starting points are thereby conceivable. For example, it may be advantageous to select the intermediate speed, especially within an allowed interval, such that an adjustment at the boundary of the operating environment has optimally taken place without an active braking action. Such a thing is especially useful if predictive operating strategies for a particularly low fuel consumption are used. However, the intermediate speed may also be chosen depending on the target speed, for example as shifted by an offset value of 10% of the target speed. It is also possible to use the environment data that form the basis of the determination of the target speed, and/or additional environment data, in order to determine a suitable intermediate speed. For example, for this it may be decided whether there is a legal speed limit which is to be more strictly complied with or a recommended speed or the like; additional environment data that may enter into it may, for example, describe the certainty in a detection of traffic signs or the like. It is noted that, naturally, it is also possible to use hard-set intermediate speeds for specific target speeds, or even to select a fixed offset value overall, for example to select the intermediate speed as always deviating by 5 km/h from the target speed.

Particular advantages result when the selection of the intermediate speed is actually embedded into predictive operating strategies for optimally power-saving achievement of the intermediate speed at the boundary of the upcoming operating environment. For example, a more distinct violation of a target speed is also possible, especially at a target speed that does not correspond to a legal speed limit, if the correct target speed may be achieved with a trailing or coasting maneuver within the predetermined time period within the upcoming operating environment. This is beneficial to an especially energy-efficient operation of the motor vehicle.

A development of the invention provides that the intermediate speed is regulated to only from the side facing toward the current speed of the motor vehicle at the beginning of the regulation to the intermediate speed, or that a speed interval that is formed from the intermediate speed and the target speed is preferably regulated to. Since, when the driver does not wish to set an offset speed as described, the goal of the regulation will temporarily be the target speed as a control speed anyway, deviations from the intermediate speed do not necessarily need to be readjusted in the direction of the target speed. For example, a coasting process, especially within the scope of a trailing maneuver or a coasting maneuver, may be continued completely within the predetermined time period or the predetermined distance, such that the target speed is slowly approached.

The regulation to the intermediate speed may advantageously take place only after selection of a corresponding control option by the driver. This means that the "tolerance mode" described here, which has advantages both with regard to energy efficiency and with regard to the comfort of the driver who would like to select an offset speed, is specifically selected by the driver as an operating mode via a control option. If the tolerance mode is not active, as is customary the target speed is achieved and set as a control speed already at the boundary of the operating environment to which the target speed is related. For example, such a control option may be carried out at a man-machine interface (MMI) of the motor vehicle.

In addition to the method, the invention also relates to a motor vehicle having a longitudinal driver assistance system with a control unit designed to implement the method according to the invention. All statements related to the method according to the invention can be analogously transferred to the motor vehicle according to the invention, with which the aforementioned advantages can likewise be attained.

Figure 2:
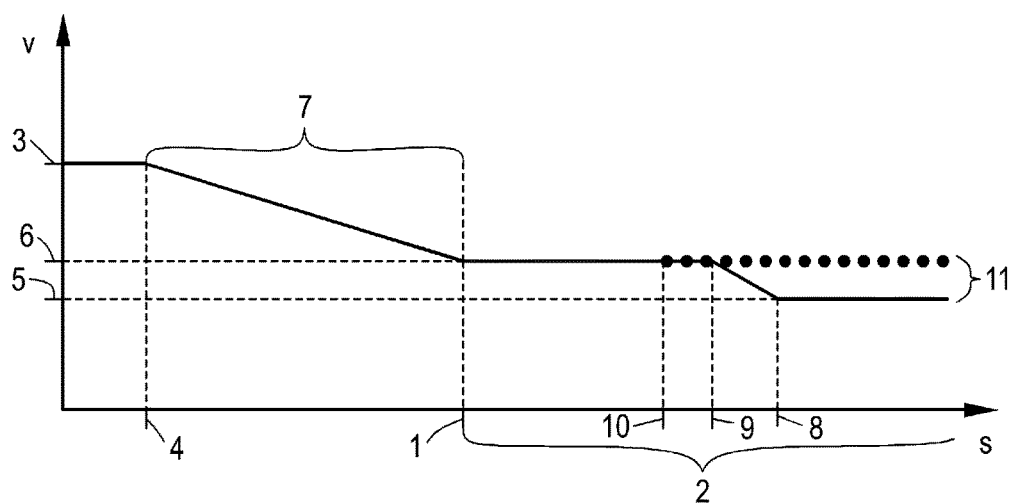
Figure 3:
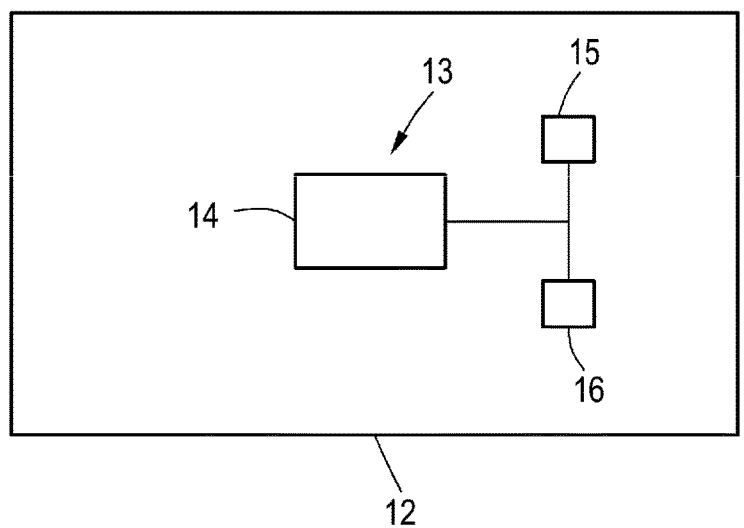

Additional advantages and individual details of the present invention result from the exemplary embodiments described in the following as well as the drawing. The following is shown:

FIG. 1 a flow chart of an exemplary embodiment of the method according to the invention, FIG. 2 a time curve of a velocity before and after reaching an operating environment for which a target speed should be provided as a control speed, and FIG. 3 a motor vehicle according to the invention.

FIG. 1 shows a workflow plan of an exemplary embodiment of the method according to invention which is embedded into the fundamentally known, typical operation of a longitudinal driver assistance system, which system is in the position to react to target speeds predetermined for specific upcoming operating environments (especially route segments) in that the target speed is used as a control speed within this operating environment. Embodiments in this regard that may operate with digital map data of a navigation system and/or camera data of a camera installed in the motor vehicle are already known in the prior art and are not intended to be presented in detail here.

In step S1, it is consequently detected that an operating environment is upcoming for which a predetermined target speed is known, for example a speed limit, that is lower than the set desired speed of the driver to which the longitudinal driver assistance system should typically regulate as a control speed if no lower predetermined target speeds are present in the current operating environment.

In step S2, a check is then made as to whether the driver has selected a tolerance operating mode via a corresponding control option. If this is not the case, in FIG. 1 it is shown in more detail for the sake of clarity how regulation to the target speed takes place immediately, as is known, upon reaching the boundary of the upcoming operating environment.

However, if the tolerance operating mode is active, an intermediate speed is determined in step S3. Because the target speed is typically lower than the current speed of the motor vehicle, especially the desired speed, this intermediate speed is most often above the target speed, but may also be below the target speed, for example when a change is made from an operating environment with a lower target speed into an operating environment with a higher target speed that, however, is still lower than the desired speed. However, the exemplary embodiment shown here predominantly applies to the instance in which the motor vehicle should be braked before reaching the upcoming operating environment.

Different variants are conceivable for determining an intermediate speed that then should lie between the target speed and the current speed of the motor vehicle, wherein in a simply designed embodiment the intermediate speed may be chosen to be higher than the target speed by a predetermined percentile as an offset value. However, the intermediate speed may also be embedded into the determination of an energy-efficient predictive operating strategy such that no active braking processes are necessary before reaching the boundary of the upcoming operating environment; rather, a trailing or coasting maneuver is already sufficient to achieve the intermediate speed.

In step S4, the motor vehicle is operated—thus slowed, in the predominant use case—such that the intermediate speed is achieved upon reaching the boundary of the upcoming operating environment for which the target speed is predetermined. After driving across the boundary, the target speed is actually reached only after a predetermined time period, alternatively also a predetermined distance, and said target speed is used as a control speed. The time period that is hereby created may especially be used by the driver in order to select an offset speed via a control element, which ensures that it is not the predetermined target speed that is used as a control speed for the operating environment, but rather the predetermined target speed plus the offset speed. If such a control action occurs, at the end of the cited time period it is naturally no longer the target speed that is subsequently sought but rather the new control speed determined by the target speed plus the offset speed.

In step S5, the typical operation of the longitudinal driver assistance system is then continued, be it with the target speed as a control speed or the target speed plus the chosen offset speed as a control speed.

FIG. 2 explains the ultimate staggered slowing process that the present method realizes in more detail using a graph in which the speed v of the motor vehicle is shown against the traveled distance s, wherein the boundary 1 of the upcoming operating environment 2 is especially emphasized. In the exemplary embodiment shown in FIG. 2, the control speed before reaching the operating environment 2 is the desired speed 3 set by the driver. At a point in time that corresponds to a position 4, it was detected by the longitudinal driver assistance system that the operating environment 2 is upcoming in which the target speed 5 (50 km/h, for example) is predetermined. However, the slowing process that now takes place does not take place toward this target speed 5 but rather toward the intermediate speed 6 which is higher than the target speed 5, wherein the slowing process 7 may presently take place purely via a trailing maneuver of the motor vehicle. The intermediate speed 6, which may be at 55 km/h, for example, is consequently achieved upon reaching the boundary 1. A position 8 at which the target speed 5 is to be achieved and is to be used as a control speed if no further control actions are performed by the driver now exists, defined by either a predetermined time period or a predetermined distance. For this, after reaching the boundary 1 regulation from a higher speed to the intermediate speed 6 is now initially further performed until—in the event that the driver performs no control action—at a position 9 the point in time is reached at which it may be ensured, via an additional trailing maneuver, that the target speed 5 is reached at the position 8, which target speed 5 is then also used as a control speed. The corresponding speed curve is shown by the solid line in FIG. 2.

However, if the driver activates a control element during the regulation to the intermediate speed 6—for example at a point in time that corresponds to the position 10—and he thereby sets an offset speed of 5 km/h, here the target speed plus the offset speed 11 corresponds to the intermediate speed 6, such that a regulation to this intermediate speed 6 may take place entirely without an additional necessary slowing or acceleration process, which is indicated by the dotted curve. Naturally, it is thereby advantageous if the intermediate speed 6 (possibly also) relates to a frequently used set offset speed or generally adjustable offset speed.

Finally, FIG. 3 shows a schematic diagram of a motor vehicle 12 according to the invention. This comprises a longitudinal driver assistance system 13, especially a speed regulation system (GRA) or an ACC system. The driver assistance system 13 has a control unit 14 that is designed to implement the method according to the invention. In particular, the control unit 14 receives data from a control element 15 (preferably designed as a lever) via which offset speeds can be selected, and from a man-machine interface 16 in which the control option of the tolerance operating mode can be selected. Naturally, the motor vehicle 12 also has the additional typical components that, however, are not shown in detail here for the sake of clarity.

The invention claimed is:

1. A method, comprising:
    operating a longitudinal driver assistance system of a motor vehicle configured to regulate a speed of the motor vehicle to a control speed,
    wherein, depending on environment data describing an operating environment in which the motor vehicle is currently operated, the control speed is changed from a desired speed provided by a driver to a target speed, and
    wherein the target speed is provided for an upcoming operating environment or is determined from the environment data,
    initially regulating the control speed of the motor vehicle to an intermediate speed for a predetermined time period or a predetermined distance in the upcoming operating environment in response to a change of the control speed to the target speed for the upcoming operating environment,
    wherein the intermediate speed deviates from the target speed in a direction of a current speed of the motor vehicle and the intermediate speed is between the current speed of the motor vehicle and the target speed; and
    regulating the control speed of the motor vehicle to the target speed after the predetermined time period expires or before the predetermined distance is traversed.

2. The method according to claim 1, further comprising:
    selecting the target speed plus an offset speed as the control speed in response to a selection of the offset speed in the operating environment, wherein the offset speed for the operating environment is adjustable by a driver.

3. The method according to claim 1, wherein the intermediate speed is determined based on a tolerance interval around the target speed as a corresponding limit of the target speed or the intermediate speed is adjustable by a driver in form of the tolerance interval.

4. The method according to claim 1, wherein the intermediate speed is selected based on additional environment data, the target speed, the current speed, or other operating data of the motor vehicle.

5. The method according to claim 1, wherein regulating the control speed of the motor vehicle to the intermediate speed comprises:
    regulating the control speed of the motor vehicle to the intermediate speed from the current speed of the motor vehicle at a beginning of the regulation to the intermediate speed, or
    regulating the control speed of the motor vehicle to a speed interval that is formed between the intermediate speed and the target speed.

6. The method according to claim 1, wherein the regulating the control speed of the motor vehicle to the intermediate speed comprises:
    regulating the control speed of the motor vehicle to the intermediate speed after selection of a corresponding control option by a driver.

7. The method according to claim 1, wherein the regulating the control speed of the motor vehicle to the intermediate speed comprises:
    regulating the control speed of the motor vehicle to the intermediate speed in response to the motor vehicle reaching a boundary of the upcoming operating environment.

8. A motor vehicle comprising:
    a longitudinal driver assistance system comprising a control unit, the control unit configured to:
        operate the longitudinal driver assistance system to regulate a speed of the motor vehicle to a control speed,
        wherein, depending on environment data describing an operating environment in which the motor vehicle is currently operated, the control speed is changed from a desired speed provided by a driver to a target speed, and
        wherein the target speed is provided for an upcoming operating environment or is determined from the environment data,
        initially regulate the control speed of the motor vehicle to an intermediate speed for a predetermined time period or a predetermined distance in the upcoming operating environment in response to a change of the control speed to the target speed for the upcoming operating environment,
        wherein the intermediate speed deviates from the target speed in a direction of a current speed of the motor vehicle and the intermediate speed is between the current speed of the motor vehicle and the target speed; and
        regulate the control speed of the motor vehicle to the target speed after the predetermined time period expires or before the predetermined distance is traversed.

9. The motor vehicle according to claim 8, wherein the control unit is further configured to:
    select the target speed plus an offset speed as the control speed in response to a selection of the offset speed in the operating environment, wherein the offset speed for the operating environment is adjustable by a driver.

10. The motor vehicle according to claim 8, wherein the intermediate speed is determined based on a tolerance interval around the target speed as a corresponding limit of the target speed or the intermediate speed is adjustable by a driver in form of the tolerance interval.

11. The motor vehicle according to claim 8, wherein the intermediate speed is selected based on additional environment data, the target speed, the current speed, or other operating data of the motor vehicle.

12. The motor vehicle according to claim 8, wherein, to regulate the control speed of the motor vehicle to the intermediate speed, the control unit is further configured to:
    regulate the control speed of the motor vehicle to the intermediate speed from the current speed of the motor vehicle at a beginning of the regulation to the intermediate speed, or
    regulate the control speed of the motor vehicle to a speed interval that is formed between the intermediate speed and the target speed.

13. The motor vehicle according to claim 8, wherein, to regulate the control speed of the motor vehicle to the intermediate speed, the control unit is further configured to:
    regulate the control speed of the motor vehicle to the intermediate speed after selection of a corresponding control option by a driver.

14. The motor vehicle according to claim 8, wherein, to regulate the control speed of the motor vehicle to the intermediate speed, the control unit is further configured to:
    regulate the control speed of the motor vehicle to the intermediate speed in response to the motor vehicle reaching a boundary of the upcoming operating environment.

* * * * *